Nov. 22, 1938.  W. H. MacINTIRE  2,137,675
PROCESS FOR OBTAINING MgO AND CaCO3 FROM DOLOMITIC MATERIALS
Filed Dec. 11, 1935
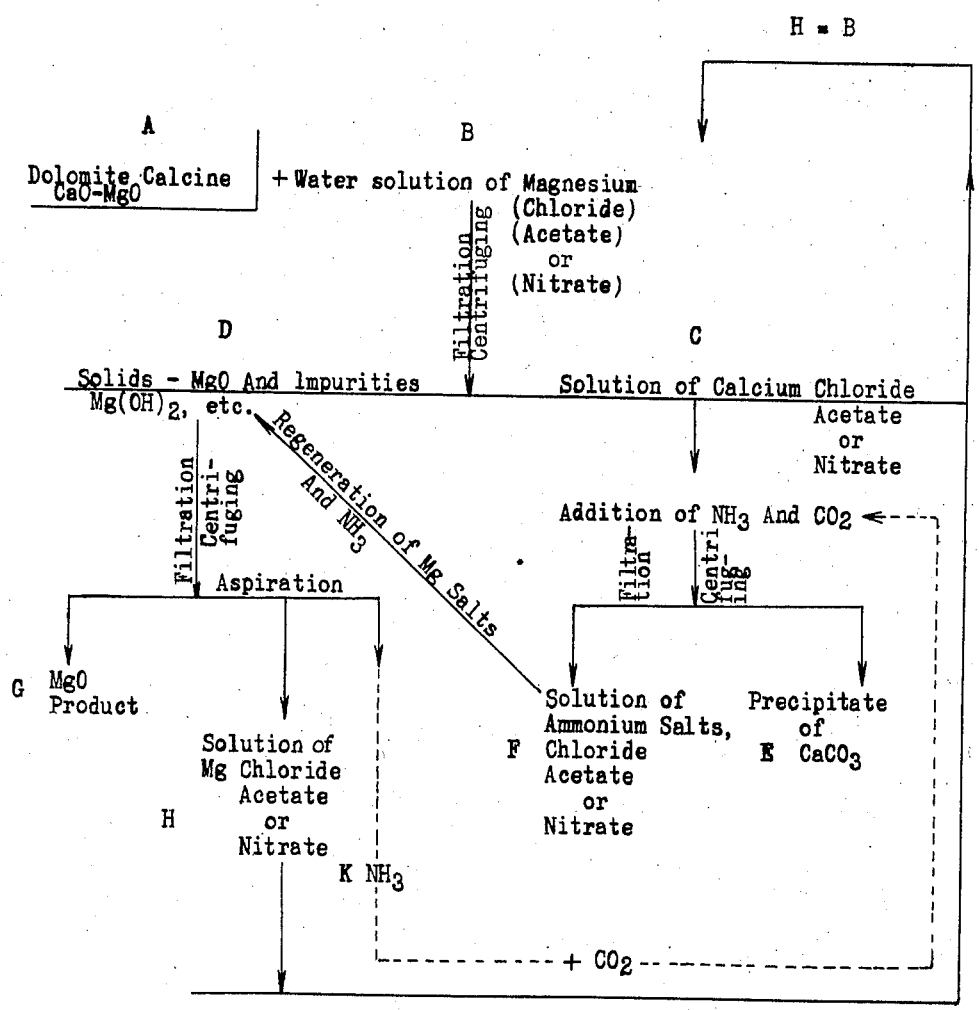
Inventor
Walter H. MacIntire.
By Cameron, Kerkam + Sutton.
Attorneys Patented Nov. 22, 1938

2,137,675

UNITED STATES PATENT OFFICE 2,137,675

PROCESS FOR OBTAINING MgO AND CaCO₃ FROM DOLOMITIC MATERIALS

Walter H. MacIntire, Knoxville, Tenn., assignor to American Zinc, Lead & Smelting Company, St. Louis, Mo., a corporation of Maine Application December 11, 1935, Serial No. 53,993

3 Claims. (Cl. 23—66)

The present invention relates to a process for obtaining both MgO and $CaCO_3$ as final products from calcines of dolomites, dolomitic limestones, magnesian limestones and the like.

Briefly stated then, the starting material is calcined dolomite or dolomitic limestone, or any oxide calcine containing a mixture of CaO and MgO.

The calcine of a predetermined or analyzed CaO-MgO content is brought into contact with a solution of magnesium salt that will produce, as the result of such contact, a solution of a calcium salt. The magnesium salt employed is preferably magnesium chloride, magnesium acetate or magnesium nitrate, though any magnesium salt that will effect an exchange that will give a soluble calcium salt may be used, such as salts of iodine or bromine. Care is taken to assure that the final $CaCO_3$ product will be free of impurities such as fluorine and magnesium. To this end the magnesium content of the added magnesium solution should be slightly less (preferably about 1% less) than the chemical equivalence of the CaO content of the CaO-MgO calcine to be treated. The proportion of one part by weight of solid calcine, to ten parts, by weight, of water in which the magnesium salt is dissolved is preferred.

The entire CaO-MgO calcine may be added directly to the magnesium salt solution, but more desirable results are secured by first adding a fraction (about ⅛) of the magnesium salt solution to the total solid calcine and a sufficient interval allowed for conversion of the CaO to $Ca(OH)_2$, after which the remaining ⅞ of the magnesium salt solution is added and the solution-suspension vigorously agitated until the reaction produces a solution of a calcium salt analogous to the starting magnesium salt. When the calcines employed carry a high content of components, such as silica, that tend to combine with and inactivate the CaO content of the calcine during calcination, longer periods of agitation may be necessary; or the exchange reaction, that brings the inactivated CaO into solution less rapidly than the free or caustic lime, may be expedited by the application of heat. Thus, if a dolomite of high content of either silica or iron is calcined, there ensues a formation of calcium silicate or calcium ferrite, respectively, and these forms do not enter into the reaction with magnesium salts with the rapidity characteristic of the calcium hydroxide formed when the dolomite calcine undergoes hydration of its free CaO content.

The several steps of the process and the products obtained will be readily understood upon reference to the accompanying diagram.

The completion of the reaction between the calcine, A, and the solution of magnesium salt or salts, B, results in a solution of the calcium salt or salts, C, and this is then filtered from the calcine, A, to obtain the solids, D. These solids, D, comprise the entire magnesium content of the original calcine, A, employed, plus the magnesia contained in the original magnesium salt solution, B, with which the CaO-MgO calcine was treated, and also a small amount of calcium hydroxide as well as the silica, iron and other impurities that were present in the starting calcine, A.

After the solids, D, have been filtered (or centrifuged) from the calcium salt solution, C, the latter is preferably treated with slightly more than the joint equivalence of $NH_3$, K, and $CO_2$, or with a corresponding quantity of ammonium carbonate, to convert the solute calcium salt, C, into the precipitate of $CaCO_3$, E. The requisite $CO_2$ may be $CO_2$ conserved from the calcination that produced the starting dolomite calcine, but in any event the $CO_2$ injected into the calcium salt solution, C, should be substantially the amount or only slightly in excess of the amount required to convert the calcium-salt into a precipitate of $CaCO_3$; but a slight excess of $NH_3$ above the ratio of 2 of $NH_3$ to 1 of $CO_2$ should be assured; that is, the resultant ammonium chloride in which the $CaCO_3$ is in suspension-solution should be slightly ammoniacal but without an excess of $CO_2$. The filtrate, F, from this precipitate $CaCO_3$, E, will contain an ammonium salt of the acid radical (chloride, acetate or nitrate) used in the original magnesium salt solution, B, with which the original CaO-MgO calcine, A, was treated. This ammonium salt filtrate, F, is then conducted back into contact with the solid MgO and $Mg(OH)_2$, D, and the latter reacts with the ammonium chloride content of the filtrate and forms a solution of magnesium chloride, with an equivalent liberation of ammonia. The result is the full recovery of the magnesium chloride of the original solution, as well as the injected ammonia. This involves the application of sufficient external heat to the suspension of mixture D, (the MgO of the original calcine and the $Mg(OH)_2$ derived from the starting magnesium salt solution, B,) with the ammonium salt filtrate, F, to raise the temperature in a closed system to approximately 100° C. The heated mixture is then aspirated and filtered to effect the regeneration, H, of the original magnesium salt solution, B, and the recovery of the ammonia content, K, of the filtrate from the $CaCO_3$, together with the solid residue, G. This solid residue, G, is substantially the MgO content of the original calcine and its insoluble impurities. The regenerated magnesium salt solution, H, and the recovered $NH_3$, K, are thus both made available for re-use in carrying out the cycle.

The MgO product, G, obtained after the regeneration and filtration of the magnesium salt solution, H, may contain some magnesium hydroxide, $Mg(OH)_2$. In such case the product, G, may be calcined lightly to obtain a more concentrated MgO product. However, one of the advantages of the process is the fact that the MgO of the original calcine is frequently only partially converted to the form $Mg(OH)_2$, and unless the highest concentration of the magnesia product is desired, the light calcination indicated may be omitted.

It will thus be seen that the calcium of the original calcine is used to take the chlorine ($Cl_2$) from the original magnesium-chloride solution and produce a solution of calcium chloride and a solid residue comprising the MgO equivalent of the magnesium chloride along with the MgO of the calcine. Subsequently the calcium of the filtered calcium chloride solution, C, is replaced by the ammonium radical ($NH_4$) and forms ammonium chloride ($NH_4Cl$), when the calcium is thrown out as calcium carbonate. This new ammonium-chloride solution serves as a carrying agent to return the chlorine to the magnesium with which it was combined in the original magnesium chloride solution. The conveyed chlorine (in the form of ammonium chloride) is thus returned to a mass of magnesia made up of ($x$) the MgO content of the calcine and ($y$) the $Mg(OH)_2$ that was thrown out of the original magnesium - chloride solution. This conveyed chlorine reacts with the ($y$) quantity of $Mg(OH)_2$ and effects the recovery of the said $Mg(OH)_2$ as a solution of $MgCl_2$ and also the ammonia as a gas. Result: ($a$) an MgO product which is practically the MgO content of the original calcine and ($b$) recovery of a solution of magnesium chloride that is practically the identical starting magnesium chloride solution. In this recovery, ($b$), the ammonia of the ammonium-chloride solution is replaced by the magnesium and this liberated ammonia gas is recovered for re-use.

It will thus be seen that the method is cyclic in character and represents first an exchange between solute magnesium and solid phase CaO, by which exchange the caustic, solid CaO is brought into solution in chemical equivalence to the stipulated amount of magnesium that is contained in the solution with which the solid CaO-MgO is treated.

The dissolved calcium salts thus generated are filtered from the undissolved fraction of the original calcine and then treated with $NH_3$ and $CO_2$ (or with ammonium carbonate), the $NH_3$ being slightly in excess of the theoretical requirements and the $CO_2$ being substantially the chemical equivalence of the dissolved calcium. By this means the solute calcium is removed from the solution as a precipitate of $CaCO_3$, which is then washed and dried. The acid radical equivalent of the precipitated calcium occurs in combination with the $NH_4$ ion in the filtrate, and this filtrate is brought into contact with the residue of magnesic solids from which the generated calcium solution was previously separated by filtration. This results in the regeneration of the original magnesium solution; in the recovery of the ammonia that was used with the $CO_2$ in the precipitation of the calcium carbonate; and a residue of MgO substantially that contained in the initial calcine.

The magnesium chloride is thus used as a carrying agent for the removal of the CaO content of the original calcine and if mechanical loss during the process is obviated, the starting solution can be used repeatedly without any build-up or replenishment. The magnesium content of the starting solution thus serves to effect two replacements, first the replacement of the calcium content of the original calcine, and secondly, the replacement of the $NH_4$ in the $NH_4Cl$ filtrate from the calcium carbonate. The net result is the production of an MgO product of small calcium content and the production of a high grade $CaCO_3$ and this without depletion of the reactant magnesium salt.

Manifestly, in carrying out the process, when MgO is the main objective, the calcines of high ratio of MgO to CaO are preferable, for example, dolomites or dolomitic limestones. But, as heretofore stated, the starting materials may be any calcic-magnesic material that contains a sufficient amount of the oxides or hydroxides of calcium and magnesium to justify production of both MgO and $CaCO_3$ as final products.

What is claimed is:

1. The process which consists in subjecting an MgO-CaO calcine to the action of a solution of any readily soluble magnesium salt capable of converting CaO into a readily soluble calcium salt, said magnesium salt solution containing slightly less (1%) of the magnesium salt than the amount requisite to effect completely such conversion of the CaO of the calcine, then separating the solids from the resultant solution of the engendered calcium salt, then treating the separated calcium salt solution with $CO_2$ and $NH_3$, the $CO_2$ being in molar equivalence and the $NH_3$ being slightly in excess of the molar equivalence of the calcium content of the solution, then separating the precipitated $CaCO_3$ from the resultant ammonium salt solution, then subjecting the solids recovered by the first separation to the action of said ammonium salt solution, and then filtering off the resultant solids.

2. The process which consists in subjecting an MgO-CaO calcine to the action of a solution of any readily soluble magnesium salt capable of converting CaO into a readily soluble calcium salt, said magnesium salt solution containing slightly less (1%) of the magnesium salt than the amount requisite to effect completely such conversion of the CaO of the calcine, then treating the solution with $CO_2$ and $NH_3$, then separating the precipitated $CaCO_3$ from the resultant ammonium salt solution, then subjecting the solids recovered by the first separation to the action of said ammonium salt solution, and then filtering off the resultant solids.

3. The process which consists in subjecting an MgO-CaO calcine to the action of a solution of any readily soluble magnesium salt capable of converting CaO into a readily soluble calcium salt, said magnesium salt solution containing slightly less (1%) of the magnesium salt than the amount requisite to effect completely such conversion of the CaO of the calcine, first adding a fraction of the magnesium salt solution to the calcine, and after the CaO thereof is converted to $Ca(OH)_2$ adding the remainder of the magnesium salt solution, agitating to complete the reaction, then filtering the solids from the solution and treating said filtered solution with $NH_3$ and $CO_2$ in amounts sufficient to effect a precipitation of the calcium carbonate without an appreciable excess of $CO_2$, filtering off the precipitate of calcium carbonate and then bringing the filtrate of ammonium salt into contact with the solids obtained from the initial treatment of the original calcine with the magnesium salt solution, raising the temperature of the solution suspension to effect liberation and recovery of the ammonia and separating the MgO from the solution.

WALTER H. MacINTIRE.